(12) United States Patent
Alexia et al.

(10) Patent No.: US 9,883,099 B2
(45) Date of Patent: Jan. 30, 2018

(54) METHOD AND DEVICE FOR PRODUCING AT LEAST ONE SELF-PORTRAIT IMAGE

(71) Applicant: DXO LABS, Boulogne-Billancourt (FR)

(72) Inventors: Jean-Marc Alexia, Alfortville (FR); Stephane Laveau, Paris (FR)

(73) Assignee: DXO LABS, Boulogne-Billancour (FR)

( * ) Notice: Subject to any disclaimer, the term of this patent is extended or adjusted under 35 U.S.C. 154(b) by 0 days.

(21) Appl. No.: 14/687,952

(22) Filed: Apr. 16, 2015

(65) Prior Publication Data

US 2016/0309075 A1    Oct. 20, 2016

(51) Int. Cl.
| H04N 9/73 | (2006.01) |
| H04N 5/232 | (2006.01) |
| H04N 5/225 | (2006.01) |
| H04N 5/235 | (2006.01) |
| G06F 3/01 | (2006.01) |
| G09G 3/36 | (2006.01) |

(52) U.S. Cl.
CPC ......... *H04N 5/23216* (2013.01); *G06F 3/017* (2013.01); *G09G 3/36* (2013.01); *H04N 5/2256* (2013.01); *H04N 5/2354* (2013.01); *H04N 5/23222* (2013.01); *H04N 5/23293* (2013.01); *G09G 2320/0626* (2013.01); *G09G 2320/0666* (2013.01)

(58) Field of Classification Search
CPC .......... H04N 5/23216; H04N 5/23293; H04N 5/2256; G06F 3/017; G09G 3/36; G09G 2320/0626; G09G 2320/0666
USPC ......... 348/333.01–333.08, 223.1–229.1, 362
See application file for complete search history.

(56) References Cited

U.S. PATENT DOCUMENTS

| 2005/0073845 A1* | 4/2005 | Matsui | G09G 3/3413 362/293 |
| 2013/0194479 A1* | 8/2013 | Jogetsu | G03B 13/04 348/333.08 |
| 2014/0168356 A1* | 6/2014 | Francois | H04N 5/23238 348/37 |
| 2014/0285699 A1* | 9/2014 | Kato | G09G 3/3406 348/333.12 |

* cited by examiner

*Primary Examiner* — Yogesh Aggarwal
(74) *Attorney, Agent, or Firm* — Im IP Law; C. Andrew Im

(57) ABSTRACT

A method and device for producing at least one self-portrait image using a mobile device having a display and an image-capturing device following at least one capture trigger of the image-capturing device. A position of the image-capturing device in relation to the orientation of the display is detected. The brightness of the display is increased and a predetermined imaged is displayed on the display. At least one self-portrait image is captured.

14 Claims, 3 Drawing Sheets

METHOD AND DEVICE FOR PRODUCING AT LEAST ONE SELF-PORTRAIT IMAGE

FIELD OF THE INVENTION

The present invention relates to a method and to a device for producing at least one self-portrait image and pertains to the field of image-capturing.

The present invention more particularly pertains to the field of production of a self-portrait image (usually known as a "selfie") or a self-portrait video.

BACKGROUND OF THE INVENTION

Self-portrait pictures (usually known as "selfies" or "wefies") are usually captured with image-capturing means (usually called a "front camera") comprised by a mobile device placed on the same side as displaying means comprised by the mobile device. The mobile device is held in a user's outstretched arm. Some mobile devices comprise guidelines, displayed on the displaying means of the mobile device, in order to guide the composition of a scene.

In professional photography, when capturing a portrait, photographers use a soft box in order to diffuse light and capture an enhanced image in which asperities are reduced. Another advantage of a soft box is to create a reflection in the eyes of the person being portrayed. A soft box is a photographic device producing soft light by creating even and diffused light. A diffuser, such as a lightbox, creates soft light by directing light through a diffusing material. A reflector bounces light off a second surface to diffuse the light. The light from a bulb is bounced off the inside of a metalized umbrella, for example, to create a soft indirect light. Some soft box devices are a combination of a diffuser and a reflector. Moreover, the synchronization of the image-capture with light producing elements is essential. Other devices often used in photography are fill-flashes or device to produces the effect of a fill light.

Mobile devices can comprise a flash enhancing the lighting of a scene while capturing an image. The flash is usually on a back camera of a mobile device, therefore, if the user wants to use said flash, the user is not able to simultaneously adjust the composition of the image using displaying means. And, the image produced using a flash fails to reduce asperities and the reflection in the eyes of the person being portrayed is hardly noticeable.

OBJECT AND SUMMARY OF THE INVENTION

The present invention aims at solving the above-mentioned drawbacks that are present in the solutions of the prior art. In particular, the present invention relates to a method using displaying means of a mobile device in order to reproduce a soft box effect, or a fill light in at least one self-portrait image.

To this end, according to a first aspect, the present invention envisages a method for producing at least one self-portrait image using a mobile device comprising displaying means and image-capturing means following at least one capture trigger of said image-capturing means comprising the following steps:

detection of a position of the image-capturing means in relation to the orientation of the displaying means,
  increase of the brightness of the displaying means and displaying a predetermined image on the displaying means,
  capture of at least one self-portrait image.

Thus, when the image-capturing means is in position to capture at least one self-portrait image, the mobile device automatically creates a soft box effect or a fill light, using the displaying means of the mobile device. The self-portrait image produced is enhanced thanks to the added light without degradations, such as blur due to an increased exposure time that becomes useless. Also, the face of the user is emphasized and smooth.

And, the display of a predetermined image, enables the user to choose the shape of the reflection in the user's eyes. Also, the color used to create soft light can be modified.

According to particular embodiments, the method further comprises the following steps:

trigger of a capture of at least one image by the image capturing means; and
  initiation of a countdown.

The countdown allows the user to adjust the composition of the image.

According to particular embodiments, the steps of increasing the brightness of the displaying means and displaying a predetermined image on the displaying means are performed just before the end of the countdown, and wherein the step of capturing said at least one self-portrait image is performed at the end of the countdown.

According to particular embodiments, said trigger is comprised in the group consisting of: voice, smile and button.

According to particular embodiments, the predetermined image is a partially white image.

A white image in which the temperature of color is balanced enhances the soft box effect and creates at least one self-portrait image obtained using a mobile device, similar to a portrait obtained by a professional photograph using a soft box or light modeler.

According to particular embodiments, the uniformity of the white image is locally adjusted to compensate the light emittance angular disparity when several subjects are in the field of view, or not centered.

According to particular embodiments, the step of displaying a predetermined image comprises the following steps:

metering of at least one characteristic of a scene captured by the image-capturing means,
  balance of the color temperature of the white in the predetermined partially white image.

An enhanced image can be obtained using the white balance of the scene to capture.

According to particular embodiments, during the step of detection, the position detected is such as the displaying means and a lens of the image-capturing means are oriented towards the same general direction.

Such a position defines the position in which a user can capture at least one self-portrait image while adjusting the composition of the image on displaying means of the mobile device.

According to particular embodiments, the step of initiation of a countdown comprises a step of notification of the countdown.

The notification of the countdown enables the user to be prepared to look into a lens of the image-capturing means at the end of the countdown. Also, until the end of the countdown the user capturing at least one self-portrait image can adjust the composition of the scene to capture.

According to particular embodiments, the method, subject of the present invention comprises a step of providing a hint to the user to look at the image-capturing means, just before the end of the countdown.

The hint provided to the user is a reminder to look at the image-capturing means in order to have at least one self-portrait in which the user does not seem to look to the side.

According to particular embodiments, the step of detection comprises a step of determination of the orientation towards the same general direction.

If the image-capturing means can swivel or if the image-capturing means are a separate device from the mobile device, such a step permits the determination of the orientation according to data from the mobile device and the image-capturing means.

According to particular embodiments wherein the mobile device comprises an accelerometer and the image-capturing means comprise an accelerometer, the step of determination of the orientation towards the same general direction depends on a scalar product of vectors representative of the gravity of each accelerometer.

Such a determination of the orientation towards the same general direction permits the mobile device to detect if the user wants to capture at least one self-portrait image, even if the image-capturing means are a separate device from the mobile device and the image-capturing means are connected to the mobile device by a wireless connection.

According to particular embodiments, wherein the image-capturing means are separate from the mobile device and the mobile device comprises other image-capturing means, the step of determination of the orientation towards the same general direction depends on image-recognition.

Such a determination of the orientation towards the same general direction permits the mobile device to detect if the user wants to capture at least one self-portrait image, even if the image-capturing means are a separate device from the mobile device and the image-capturing means are connected to the mobile device by a wireless connection.

According to particular embodiments, wherein the displaying means are a liquid crystal display and the step of increase of the brightness is implemented by increasing rapidly and over a short period of time, the intensity of the current supplying the displaying means.

These embodiments present the advantage of generating a high intensity, similar to flash photography, on a large surface, thus enhancing the at least one self-portrait image.

According to a second aspect, the present invention envisages a method for producing at least one self-portrait image using a mobile device comprising displaying means and image-capturing means comprising the following steps:
  detection of a position of the image-capturing means in relation to the orientation of the displaying means, the position detected is such as the displaying means and a lens of the image-capturing means are oriented towards the same general direction,
  determination of the orientation towards the same general direction,
  trigger of a capture of at least one image by the image-capturing means,
  initiation of a countdown,
  notification of the countdown,
  just before the end of the countdown:
    providing a hint to the user to look at the image-capturing means,
    increase of the brightness of the displaying means,
    meter of at least one characteristic of a scene captured by the image-capturing means,
    balance of the color temperature of the white in a partially white image and
    displaying the partially white image on the displaying means;
  at the end of the countdown, capture of at least one self-portrait image.

The advantages of such a method are a combination of the advantages previously cited in order to capture an enhanced self-portrait picture using the most advantageous combination of the particular embodiments of the invention.

According to a third aspect, the present invention envisages a device for producing at least one self-portrait image comprising:
  a mobile device comprising:
    displaying means, displaying a predetermined image just before the end of a countdown,
    means to detect a position of the image-capturing means in relation to the orientation of the displaying means,
    means to trigger a capture of at least one image by the image-capturing means,
    means to initiate a countdown,
    means to increase the brightness of the displaying means, just before the end of the countdown, and
  image-capturing means comprising a lens to capture at least one self-portrait image at the end of the countdown.

The advantages, aims and particular embodiments of the device subject of the present invention are similar to those of a method subject of the present invention.

BRIEF DESCRIPTION OF THE DRAWINGS

Other advantages, aims and particular embodiments of the present invention will become apparent from the description that will follow, made, as an example that is in no way limiting, with reference to the drawings included in an appendix, in which.

DETAILED DESCRIPTION OF THE EMBODIMENTS

It should be noted that the drawings are not according to scale.

Through the description, the terms "mobile device" designate any mobile device through witch information can be exchanged, such as a smartphone, a tablet or a digital camera, for example. The terms "displaying means" designate means for displaying information, such as a screen of a touchscreen or a liquid crystal display, for example. The terms "image-capturing means" designate any device for capturing digital information representative of a captured scene. The mobile device can comprise the image-capturing means, or the image-capturing means can be a separate device connected to the mobile device. The terms "at least one self-portrait image" designate a self-portrait image or a self-portrait stream of images. In other terms, a self-portrait image is a still image, and a self-portrait stream of images is a video. The term "scene" designates a representation of a set of information of a physical environment transduced by the image-capturing means. The terms "partially white image" designate an image comprising shades of white.

Figure 1:
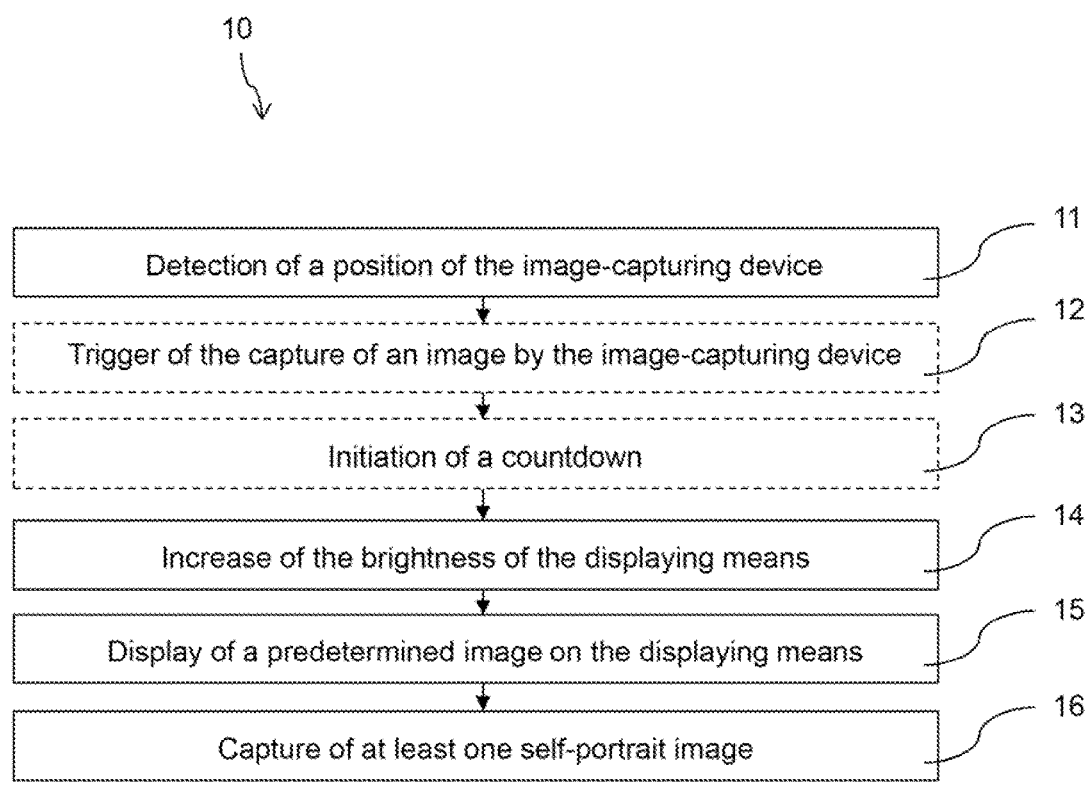
FIG. 1 represents, in the form of a logical diagram, steps utilized in particular embodiments of the methods that are the subject of the present invention.

FIG. 1 represents steps utilized in particular embodiments of the methods that are the subject of the present invention.

The method 10 for producing at least one self-portrait image using a mobile device 305 comprising displaying means 315 and image-capturing means 310 comprises the following steps:
- detection 11 of a position of the image-capturing means 310 in relation to the orientation of the displaying means 315,
- trigger 12 of a capture of at least one image by the image-capturing means 310,
- initiation 13 of a countdown,
- just before the end of the countdown:
  - increase 14 of the brightness of the displaying means 315 and
  - displaying 15 a predetermined image on the displaying means 315,
- at the end of the countdown, capture 16 of at least one self-portrait image.

In particular embodiments, if the image-capturing means 310 are a separate device from the mobile device 305, the method comprises a step of connection of the image-capturing means 310 to the mobile device 305. The step of connection is carried out by a user. During the step of connection, the image-capturing means 310 are connected to the mobile device 305 through means to connect comprised by the image-capturing means 310 and the mobile device 305. Preferably, the means to connect are a female connector complementary to a male connector. The female connector can be comprised by the image-capturing means 310 and the male connector can be comprised by the mobile device 305, and vice versa. Each connector may be:
- a USB (universal serial bus) connector,
- a micro-USB connector,
- a lightning connector (Registered Trademark from Apple Inc.),
- or any kind of electronic connector.

In particular embodiments, the means to connect are wireless. The wireless connection may be a Bluetooth connection, a connection according to IEEE 802.11 protocols ("Wi-Fi"), a connection according to IEEE 802.15.4 protocols.

The step of detection 11 determines a position of the image-capturing means 310 in relation to the orientation of the displaying means 315. If the position detected is such as the displaying means 315 and a lens 340 of the image-capturing means 310 are oriented towards the same general direction, the method 10 continues. Else, the method 10 is not implemented. The general direction is defined as an orientation in which a user, holding the image-capturing means 310 or the mobile device 305, can appear in a scene, captured by the image-capturing means 310 and displayed by the displaying means 315, and can view the display of the scene on the displaying means 315.

The step of detection 11 can comprise a step of determination of the orientation towards the same general direction.

In particular embodiments wherein the image-capturing means 310 are a separate device from the mobile device 305. And wherein the image-capturing means 310 comprise an accelerometer, and the mobile device 305 comprises an accelerometer. The determination of the same general direction depends on the scalar product of vectors, 350 and 355, representative of the gravity of each accelerometer. For example, if the scalar product is negative the mobile device 305 and the image-capturing device 310 are considered as oriented toward the same general direction. If the scalar product is positive, the mobile device 305 and the image-capturing device 310 are considered as not oriented towards the same general direction. In another example, if the scalar product is positive, the mobile device 305 and the image-capturing device 310 are considered as oriented toward the same general direction. If the scalar product is negative, the mobile device 305 and the image-capturing device 310 are considered as not oriented towards the same general direction. The examples cited above depend on the initial configuration of the accelerometers. In particular embodiments, the data of the accelerometers can be recorded over a short period of time. The scalar product can be calculated according to the recorded data in order to prevent an error of determination of the orientation.

In particular embodiments wherein the mobile device 305 comprises built-in image-capturing means, such as a front camera, and the image-capturing means 310 are a separate device from the mobile device 305, the step of determination of the same general direction is implemented by image recognition. Preferably, the image recognition is a comparison of a scene captured by the built-in image-capturing means of the mobile device 305 and a scene captured by the image-capturing device 310. If the image recognition detects similar elements in the captured scene, the mobile device 305 and the image-capturing device 310 are considered as oriented towards the same general direction. If not, the mobile device 305 and the image-capturing device 310 are not considered as oriented towards the same general direction. The similar elements are parts of a scene such as transitions, angles, patterns, for example. The detection of similar elements can be implemented by subtracting the image of a scene of one of the image-capturing means from the image of a scene of the other image-capturing means.

In particular embodiments, wherein the mobile device 305 comprises the image-capturing means 310, the step of detection 11 detects if the image-capturing means 310 are activated. The displaying means 315 and a lens 340 of the image-capturing means 310 are oriented towards the same general direction. The general direction is defined as an orientation in which a user, holding the image-capturing means 310 or the mobile device 305, can appear in a scene, captured by the image-capturing means 310 and displayed by the displaying means 315, and can view the display of the scene on the displaying means 315. For example, the image-capturing means 310 comprised by the mobile device 305 can be a front camera of the mobile device 305 or a swiveling camera of the mobile device 305.

Once such a position is detected, the user can enable the step of triggering 12 a capture of at least one image by the image-capturing means 310. The trigger of a capture of at least one image can be:
- a physical interaction between the user and the mobile device 305, such as the activation of a button, the button is, for example, a digital button appearing the displaying means 315 if the displaying means 315 are a touchscreen, a touch sensor, a pushbutton,
- a physical interaction between the user and the image-capturing means 310, such as the activation of a button, the button is for example a touch sensor or a pushbutton,
- a voice activated trigger,
- a facial recognition trigger, such as the detection of a wink or a smile, for example,
- an image recognition trigger, such as the detection of the upper body of a human being,
- a movement trigger, such as a wave of hand for example,
- a detection of a generally still position, the position can be detected by an accelerometer comprised in the mobile device 305 or by a scene recognition, the scene being captured by the image-capturing means 310, and more generally, any type of trigger implemented by any image-capturing means 310.

Once the capture of at least one image is triggered, the initiation 13 of a countdown is implemented. The countdown is preferably a countdown of approximately a period of a few seconds. In particular embodiments, the countdown can be notified to the user. The notification of the countdown can be a display of the countdown overlapping the scene captured by the image-capturing means 310. The user can see the scene and adjust the composition of the scene while the countdown counts down. The notification of the countdown can also be a prerecorded vocal message, a text to speech synthesized message, or a blinking light.

Just before the end of the countdown, the brightness of the displaying means 315 is increased. The step of increase 14, preferably increases the brightness of the displaying means 315 to the maximum which can be provided by the mobile device 305. If the brightness of the displaying means 315 previously set to a maximum, the step of increase 14 locks the brightness settings.

In particular embodiments wherein the displaying means 315 are a liquid crystal display (also known as LCD), the step of increase is implemented by increasing rapidly and over a short period of time, the intensity of the current supplying the displaying means backlight 315. The short period of time corresponds at least to the exposure time. Such an increase in intensity can implemented by the creation of a controlled voltage pike.

Just before the end of the countdown, a step of display 15 of a predetermined image on the displaying means 315 is implemented. The predetermined image is preferably a partially white image such as an all-white image, a non-uniform white image or a white shape on a black background. For example, the shape can be any geometrical shape. The temperature of the white color can be predefined. The white color is a color defined amongst computed shades of white.

In particular embodiments, the scene captured by the image-capturing means 310 is displayed simultaneously as the partially white image displayed during the step of display 15. The display of the scene captured enables the user to have a live view of the at least one self-portrait image captured, and more particularly during the capture of stream of a self-portrait images.

Such a display of the scene captured, can be on a part of the displaying means 315. The part of the screen dedicated to such a display is preferably less than fifty percent of the total surface of the displaying means 315. Preferably, the display of the scene captured on a part of the displaying means 315 is located as close as possible to the image-capturing means 310.

The partially white image can overlay such a display of the scene captured. The scene captured by the image-capturing means 310 can be processed, by image-processing means for example, before the display, so as to be displayed in transparency under the partially white image. The processing can be, one or any combination of the following examples of image-processing:

an extraction of the contours of the scene captured,
a transformation of the image into a grey scale image,
an increase of the contrast or,
an extraction of the transitions in the scene capture,
a facial recognition displaying a square or a predefined silhouette at the localization of the face of each user.

The step of increase 14 and displaying 15 can be implemented simultaneously or one after the other.

Just before the end of the countdown, if the mobile device 305 or the image-capturing means 310 comprise means to vibrate, the method 10 can comprise a step of deactivation of the means to vibrate.

At the end of the countdown, the step of capture 16 of at least one self-portrait image is implemented by the image-capturing means 310. At least one self-portrait image captured can be displayed on the displaying means 315.

In particular embodiments, the image captured can be subject to automatic image-processing.

In particular embodiments, the method 20 can comprise a step of switching the settings of the mobile device 305 back to the settings implemented by the mobile device 305 before the trigger of the capture of at least one self-portrait image.

Figure 2:
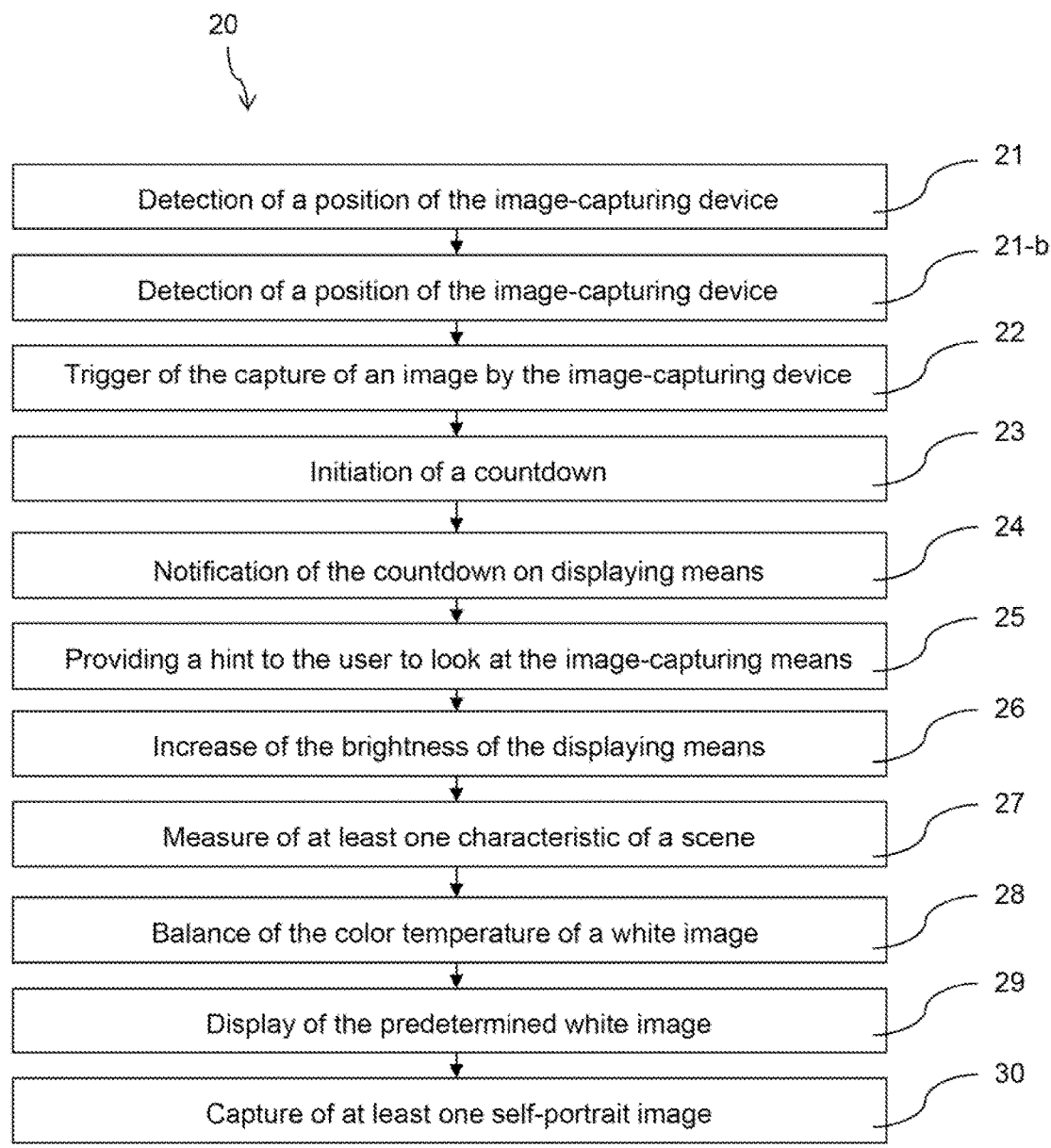
FIG. 2 represents, in the form of a logical diagram, steps utilized in particular embodiments of the methods that are the subject of the present invention, FIG. 3 schematically represents one particular embodiment of the device that is the subject of the present invention.

FIG. 2 represents steps utilized in particular embodiments of the methods that are the subject of the present invention.

The method 20 for producing at least one self-portrait image using a mobile device 305 comprising displaying means 315 and image-capturing means 310 comprises the following steps:

detection 21 of a position of the image-capturing means 310 in relation to the orientation of the displaying means 315, the position detected is such as the displaying means 315 and a lens 340 of the image-capturing means 310 are oriented towards the same general direction, determination 21-b of the orientation towards the same general direction, trigger 22 of a capture of at least one image by the image-capturing means 310, initiation 23 of a countdown, notification 24 of the countdown on the displaying means 315 of the mobile device 305, just before the end of the countdown:

providing 25 a hint to the user to look at the image-capturing means 310, increase 26 of the brightness of the displaying means 315, meter 27 of at least one characteristic of a scene captured by the image-capturing means 310, balance 28 of the color temperature of the white in the predetermined partially white image, displaying 29 the partially white image on the displaying means 315;

at the end of the countdown, capture 30 of at least one self-portrait image.

In particular embodiments, if the image-capturing means 310 are a separate device from the mobile device 305, the method comprises a step of connection of the image-capturing means 310 to the mobile device 305. The step of connection is carried out by a user. During the step of connection, the image-capturing means 310 is connected to the mobile device 305 through means to connect comprised by the image-capturing means 310 and the mobile device 305. Preferably, the means to connect are a female connector complementary to a male connector. The female connector can be comprised by the image-capturing means 310 and the male connector can be comprised by the mobile device 305, and vice versa. Each connector may be:

a USB (universal serial bus) connector,
a micro-USB connector,
a lightning connector (Registered Trademark from Apple Inc.), or
any kind of electronic connector.

In particular embodiments, the means to connect are wireless. The wireless connection may be a Bluetooth connection, a connection according to IEEE 802.11 protocols ("Wi-Fi"), a connection according to IEEE 802.15.4 protocols.

The step of detection 21 determines a position of the image-capturing means 310 in relation to the orientation of the displaying means 315. If the position detected is such as the displaying means 315 and a lens 340 of the image-capturing means 310 are oriented towards the same general direction, the method 20 continues. Else, the method 20 is not implemented. The general direction is defined as an orientation in which a user, holding the image-capturing means 310 or the mobile device 305, can appear in a scene, captured by the image-capturing means 310 and displayed by the displaying means 315, and can view the display of the scene on the displaying means 315.

The step of detection 21 comprises a step of determination 21-b of the orientation towards the same general direction.

In particular embodiments wherein the image-capturing means 310 are a separate device from the mobile device 305. And wherein the image-capturing means 310 comprise an accelerometer, and the mobile device 305 comprises an accelerometer. The determination 21-b of the same general direction depends on the scalar product of vectors, 350 and 355, representative of the gravity of each accelerometer. For example, if the scalar product is negative the mobile device 305 and the image-capturing device 310 are considered as oriented toward the same general direction. If the scalar product is positive, the mobile device 305 and the image-capturing device 310 are considered as not oriented towards the same general direction. In another example, if the scalar product is positive, the mobile device 305 and the image-capturing device 310 are considered as oriented toward the same general direction. If the scalar product is negative, the mobile device 305 and the image-capturing device 310 are considered as not oriented towards the same general direction. The examples cited above depend on the initial configuration of the accelerometers. In particular embodiments, the data of the accelerometers can be recorded over a short period of time. The scalar product can be calculated according to the recorded data in order to prevent an error of determination 21-b of the orientation.

In particular embodiments wherein the mobile device 305 comprises built-in image-capturing means, such as a front camera, and the image-capturing means 310 are a separate device from the mobile device 305, the step of determination 21-b of the same general direction is implemented by image recognition. Preferably, the image recognition is a comparison of a scene captured by the image-capturing device of the mobile device 305 and a scene captured by the image-capturing device 310. If the image recognition detects similar elements in the captured scene, the mobile device 305 and the image-capturing device 310 are considered as oriented towards the same general direction. If not, the mobile device 305 and the image-capturing device 310 are not considered as oriented towards the same general direction. The similar elements are parts of a scene such as transitions, angles, patterns, for example. The detection of similar elements can be implemented by subtracting the image of a scene of one of the image-capturing means from the image of a scene of the other image-capturing means.

In particular embodiments, wherein the mobile device 305 comprises the image-capturing means 310, the step of detection 21 detects if the image-capturing means 310 are activated. The displaying means 315 and a lens 340 of the image-capturing means 310 are oriented towards the same general direction. The general direction is defined as an orientation in which a user, holding the image-capturing means 310 or the mobile device 305, can appear in a scene, captured by the image-capturing means 310 and displayed by the displaying means 315, and can view the display of the scene on the displaying means 315. For example, the image-capturing means 310 comprised by the mobile device 305 can be a front camera of the mobile device 305 or a swiveling camera of the mobile device 305.

Once such a position is detected, the user can enable the step of triggering 22 a capture of at least one image by the image-capturing means 310. The trigger of a capture of at least one image can be:
- a physical interaction between the user and the mobile device 305, such as the activation of a button, the button is, for example, a digital button appearing the displaying means 315 if the displaying means 315 are a touchscreen, a touch sensor, a pushbutton,
- a physical interaction between the user and the image-capturing means 310, such as the activation of a button, the button is for example a touch sensor or a pushbutton,
- a voice activated trigger,
- a facial recognition trigger, such as the detection of a wink or a smile, for example,
- an image recognition trigger, such as the detection of the upper body of a human being,
- a movement trigger, such as a wave of hand for example,
- a detection of a generally still position, the position can be detected by an accelerometer comprised in the mobile device 305 or by a scene recognition, the scene being captured by the image-capturing means 310, and
- more generally, any type of trigger implemented by any image-capturing means 310.

In particular embodiments, the user can predefine the type of trigger to implement.

Once the capture of at least one image is triggered, the initiation 23 of a countdown is implemented. The countdown is preferably a countdown of approximately a period of a few seconds.

The step of notification 24 of the countdown on the displaying means 315 of the mobile device 305, begins at the initiation of the countdown. The display 25 of the countdown can be overlapping the scene captured by the image-capturing means 310. The user can see the scene and adjust the composition of the scene while the countdown counts down. The notification of the countdown can also be a prerecorded vocal message, a text to speech synthesized message, or a blinking light.

Just before the end of the countdown, the method provides 25 a hint to the user to look at the image-capturing means 310. The hint can be a message reminding the user to look towards the image-capturing means 310. The hint can be displayed on the displaying means 315 of the mobile device 305. The message can be, "look at the lens", for instance. In particular embodiments, the user can predefine the type of message to display. The hint provided can be:
- a visual notification, such as a light blinking light,
- a prerecorded text message, "look at the lens" for example,
- a text to speech synthesized voice, the speech can be adapted by the user for example,
- a sound or
- if the mobile device 305 is connected to a connected watch, a visual notification of the connected watch, for example.

Just before the end of the countdown, the brightness of the displaying means 315 is increased. The step of increase 26, preferably increases the brightness of the displaying means 315 to the maximum which can be provided by the mobile device 305. If the brightness of the displaying means 315 previously set to a maximum, the step of increase 25 locks the brightness settings.

In particular embodiments wherein the displaying means 315 are a liquid crystal display (also known as LCD), the step of increase 26 is implemented by increasing rapidly and over a short period of time, the intensity of the current supplying the displaying means backlight 315. The short period of time corresponds at least to the exposure time. Such an increase in intensity can implemented by the creation of a controlled voltage pike.

Just before the countdown, a meter 27 of at least one characteristic of a scene captured by the image-capturing means 310 can be implemented by the image-capturing means 310 or by the mobile device 305. The meter 27 of at least one characteristic leads to the balance 28 of the color temperature of the white of a partially white image in relation to at least one characteristic metered.

The characteristics metered can be, for example:
the white balance,
the exposure,
a detection of another light source in the scene,
a number of other light sources in the scene of a similar temperature of color or
the average temperature of color of the scene.

In particular embodiments, the method can comprise a step of modification of at least one parameter of the partially white image. The parameter can be:
the hue of the partially white image,
the luminous intensity of the partially white image.

The partially white image can be displayed 29 on the displaying means 315. The display 29 of the partially white image reproduces the effect of a soft box.

Preferably, the step of providing 25 a hint is implemented before the step of display 29. The step of providing 25 a hint can be implemented simultaneously to the step of increase 26. The step of increase 26 and display 29 can be implemented simultaneously or one after the other.

The partially white image is preferably a partially white image such as an all-white image covering the displaying means 315 of the mobile device 305. The partially white image may also be a white shape on a black background. For example, the shape can be any geometrical shape, such as a diamond, a triangle, a hexagon or an octagon. Hence, the reflection in the eyes of the user can be adapted. The method 20 can comprise a step of selection of the partially white image to display during the step of display 29. The white color is a color defined amongst computed shades of white.

Preferably, the step of display 29 of a partially white image is implemented just after the countdown arrives at zero and just before the step of capture 30 of at least one self-portrait image. The step of display 29 of a partially white image may also be implemented just after the step of providing 25 a hint to the user and just before the step of capture 30 of at least one self-portrait image.

In particular embodiments, the scene captured by the image-capturing means 310 is displayed simultaneously as the partially white image displayed during the step of display 29. The display of the scene captured enables the user to have a live view of the at least one self-portrait image captured, and more particularly during the capture of a stream of self-portrait images.

Such a display of the scene captured, can be on a part of the displaying means 315. The part of the screen dedicated to such a display is preferably less than fifty percent of the total surface of the displaying means 315. Preferably, the display of the scene captured on a part of the displaying means 315 is located as close as possible to the image-capturing means 310.

The partially white image can overlay such a display of the scene captured. The scene captured by the image-capturing means 310 can be processed, by image-processing means for example, before the display, so as to be displayed in transparency under the partially white image. The processing can be, one or any combination of the following examples of image-processing:
an extraction of the contours of the scene captured,
a transformation of the image into a grey scale image,
an increase of the contrast or,
an extraction of the transitions in the scene captured,
a facial recognition displaying a square or a predefined silhouette at the localization of the face of each user The temperature of the white color is preferably defined at the step of balance 28.

Just before the end of the countdown, if the mobile device 305 or the image-capturing means 310 comprise means to vibrate, the method 20 can comprise a step of deactivation of the means to vibrate.

At the end of the countdown, the step of capture 30 of at least one self-portrait image is implemented by the image-capturing means 310. At least one self-portrait image captured can be displayed on the displaying means 315.

In particular embodiments, the image captured can be subject to automatic image-processing.

In particular embodiments, the method 20 can comprise a step of switching the settings of the mobile device 305 back to the settings implemented by the mobile device 305 before the trigger of the capture of at least one self-portrait image.

Figure 3:
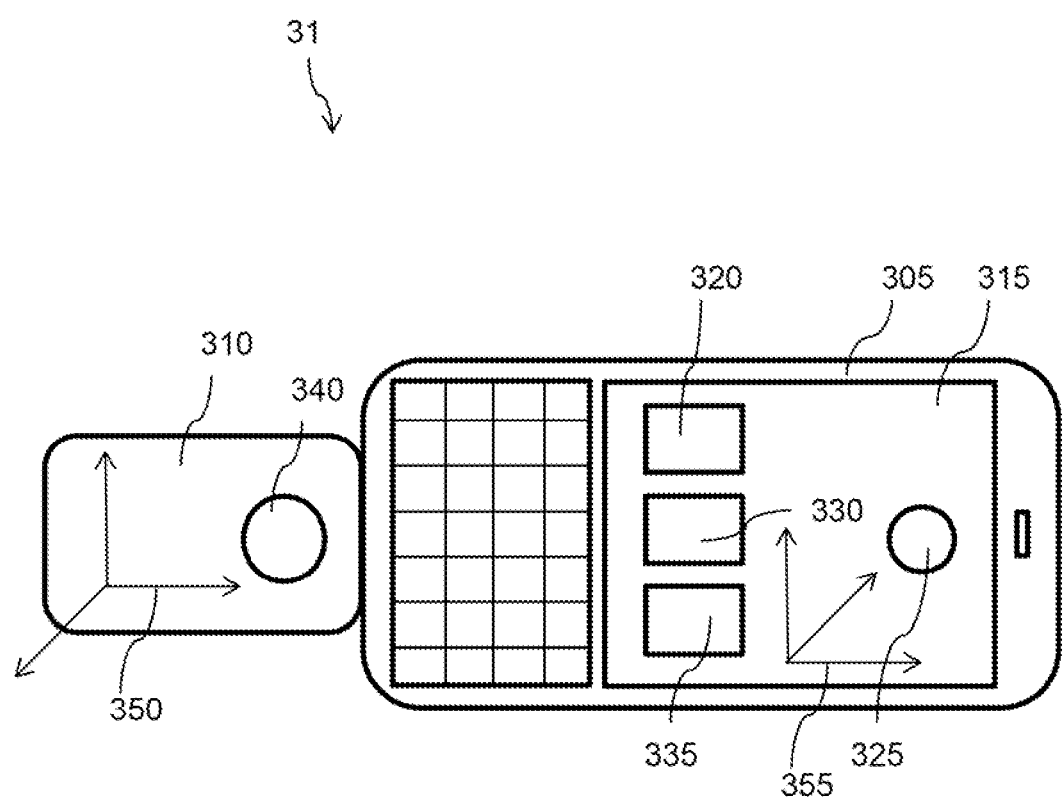

FIG. 3 represents, schematically, one particular embodiment of the device that is the subject of the present invention.

The device 31 for producing at least one self-portrait image comprises:
a mobile device 305 comprising:
displaying means 315, displaying a predetermined image just before the end of a countdown,
means to detect 320 a position of the image-capturing means 310 in relation to the orientation of the displaying means 315,
means to trigger 325 a capture of at least one image by the image-capturing means 310,
means to initiate 330 a countdown,
means to increase 335 the brightness of the displaying means 315, just before the end of the countdown, and
image-capturing means 310 comprising a lens 340 to capture at least one self-portrait image at the end of the countdown.

The mobile device 305 comprises displaying means 315. The mobile device 305 is a mobile phone, such as a smartphone for example, a tablet, a tablet computer, a portable computer, a digital camera or any type of mobile device 305. In particular embodiments, the mobile device 305 can be mounted on a selfie stick.

The displaying means 315 may be any type of screen, such as a touch screen for example. Preferably, the displaying means 315 display a representation of a scene captured by the image-capturing means 310. Just before the countdown, the displaying means 315 display a partially white image. The displaying means 315 of the mobile device 305, can display a countdown. The notification of the countdown can be a display of the countdown overlapping the scene captured by the image-capturing means 310. The user can see the scene and adjust the composition of the scene while the countdown counts down.

In particular embodiments, the mobile device can comprise means to emit a sound. The notification of the countdown can also be a prerecorded vocal message or a text to speech synthesized message emitted by the means to emit a sound.

In particular embodiments, the scene captured by the image-capturing means 310 is displayed simultaneously as the partially white image displayed by the image-capturing means 310. The display of the scene captured enables the user to have a live view of the at least one self-portrait image captured, and more particularly during the capture of a self-portrait stream of images.

Such a display of the scene captured, can be on a part of the displaying means 315. The part of the screen dedicated to such a display is preferably less than fifty percent of the total surface of the displaying means 315. Preferably, the display of the scene captured on a part of the displaying means 315 is located as close as possible to the image-capturing means 310.

The partially white image can overlay such a display of the scene captured. The scene captured by the image-capturing means 310 can be processed, by image-processing means for example, before the display, so as to be displayed in transparency under the partially white image. The processing can be, one or any combination of the following examples of image-processing:
- an extraction of the contours of the scene captured,
- a transformation of the image into a grey scale image,
- an increase of the contrast or,
- an extraction of the transitions in the scene captured,
- a facial recognition displaying a square or a predefined silhouette at the localization of the face of each user.

In particular embodiments, if the image-capturing means 310 are a separate device from the mobile device 305, the mobile device 305 comprises means to connect image-capturing means 310 to the mobile device 305. The image-capturing means 310 comprises means to connect the image-capturing means 310 to the mobile device 305. Preferably, the means to connect are a female connector complementary to a male connector. The female connector can be comprised by the image-capturing means 310 and the male connector can be comprised by the mobile device 305, and vice versa.
Each connector may be:
- a USB (universal serial bus) connector,
- a micro-USB connector,
- a lightning connector (Registered Trademark from Apple Inc.),
- or any kind of electronic connector.

In particular embodiments, the means to connect are wireless. The wireless connection may be a Bluetooth connection, a connection according to IEEE 802.11 protocols ("Wi-Fi"), a connection according to IEEE 802.15.4 protocols.

The mobile device 305 comprises means to detect 320 a position of the image-capturing means 310 in relation to the orientation of the displaying means 315. The position detected is such as the displaying means 315 and a lens 340 of the image-capturing means 310 are oriented towards the same general direction. The general direction is defined as an orientation in which a user, holding the image-capturing means 310 or the mobile device 305, can appear in a scene, captured by the image-capturing means 310 and displayed by the displaying means 315, and can view the display of the scene on the displaying means 315. The means to detect 320 a position are a microprocessor, for example.

The means to detect 320 can comprise means to determine the orientation towards the same general direction.

In particular embodiments wherein the image-capturing means 310 are a separate device from the mobile device 305. And wherein the image-capturing means 310 comprise an accelerometer, and the mobile device 305 comprises an accelerometer. The determination of the same general direction, by the means to determine, depends on the scalar product of vectors, 350 and 355, representative of the gravity of each accelerometer. For example, if the scalar product is negative the mobile device 305 and the image-capturing device 310 are considered as oriented toward the same general direction. If the scalar product is positive, the mobile device 305 and the image-capturing device 310 are considered as not oriented towards the same general direction. In another example, if the scalar product is positive, the mobile device 305 and the image-capturing device 310 are considered as oriented toward the same general direction. If the scalar product is negative, the mobile device 305 and the image-capturing device 310 are considered as not oriented towards the same general direction. The examples cited above depend on the initial configuration of the accelerometers. In particular embodiments, the data of the accelerometers can be recorded over a short period of time. The scalar product can be calculated according to the recorded data in order to prevent an error of determination of the orientation.

In particular embodiments wherein the mobile device 305 comprises built-in image-capturing means, such as a front camera, and the image-capturing means 310 are a separate device from the mobile device 305, the determination of the same general direction, by the means to determine, is implemented by image recognition. Preferably, the image recognition is a comparison of a scene captured by the built-in image-capturing means of the mobile device 305 and a scene captured by the image-capturing device 310. If the image recognition detects similar elements in the captured scene, the mobile device 305 and the image-capturing device 310 are considered as oriented towards the same general direction. If not, the mobile device 305 and the image-capturing device 310 are not considered as oriented towards the same general direction. The similar elements are parts of a scene such as transitions, angles, patterns, for example. The detection of similar elements can be implemented by subtracting the image of a scene of one of the image-capturing means from the image of a scene of the other image-capturing means.

In particular embodiments, the mobile device 305 comprises the image-capturing means 310. The displaying means 315 and a lens 340 of the image-capturing means 310 are oriented towards the same general direction. The general direction is defined as an orientation in which a user, holding the image-capturing means 310 or the mobile device 305, can appear in a scene, captured by the image-capturing means 310 and displayed by the displaying means 315, and can view the display of the scene on the displaying means 315. For example, the image-capturing means 310 comprised by the mobile device 305 can be a front camera of the mobile device 305 or a swiveling camera of the mobile device 305.

The mobile device 305 comprises means to trigger 325 a capture of at least one image by the image-capturing means 310. The means to trigger 325 a capture of at least one image can be means to detect:

a physical interaction between the user and the mobile device 305, such as the activation of a button, the button is, for example, a digital button appearing the displaying means 315 if the displaying means 315 are a touchscreen, a touch sensor, a pushbutton, a physical interaction between the user and the image-capturing means 310, such as the activation of a button, the button is for example a touch sensor or a pushbutton, a voice activated trigger, a facial recognition trigger, such as the detection of a wink or a smile, for example, an image recognition trigger, such as the detection of the upper body of a human being, a movement trigger, such as a wave of hand for example, a detection of a generally still position, the position can be detected by an accelerometer comprised in the mobile device 305 or by a scene recognition, the scene being captured by the image-capturing means 310, and more generally, any type of trigger implemented by any image-capturing means 310.

The means to trigger 325 can be a microprocessor, for example.

The mobile device 305 comprises means to initiate 330 a countdown. The means to initiate 330 a countdown can be a microprocessor, for example. The means to initiate a countdown can interact with a clock provided by the mobile device 305, for example.

In particular embodiments, the mobile device 305 comprises means to provide a hint to the user to look at the image-capturing means 310. The hint can be a message reminding the user to look towards the image-capturing means 310. The hint can be displayed on the displaying means 315 of the mobile device 305. The message can be, "look at the lens", for instance. In particular embodiments, the user can predefine the type of message to display. The hint provided can be:

a visual notification, such as a blinking light, a prerecorded text message, "look at the lens" for example, a text to speech synthesized voice, the speech can be adapted by the user for example, a sound or if the mobile device 305 is connected to a connected watch, a visual notification of the connected watch, for example.

In particular embodiments, the mobile device 305 comprises means to notify the countdown. The means to notify the countdown can command a display of the countdown overlapping the scene captured by the image-capturing means 310 on the displaying means 315 of the mobile device 305. The user can see the scene and adjust the composition of the scene while the countdown counts down. The means to notify the countdown can also command a prerecorded vocal message or a text to speech synthesized message.

In particular embodiments, the device 31 can comprise means to meter at least one characteristic of a scene, such as the white balance, captured by the image-capturing means 310. The means to meter at least one characteristic, such as the white balance, can be comprised by the image-capturing means 310 or by the mobile device 305. The device 31 can comprise means to balance the color temperature of the white of a partially white image in relation to at least one characteristic metered. The partially white image can be displayed on the displaying means 315. The display of the partially white image reproduces the effect of a soft box.

The mobile device 305 comprises means to increase 335 the brightness of the displaying means 315 just before the end of the countdown. Preferably, the means to increase 335 the brightness are connected to means to control the brightness comprises by the mobile device 305. The means to increase 335 the brightness of the displaying means backlight 315 can lock the brightness settings to a maximum. The means to increase 335 the brightness can be a microprocessor, for example.

In particular embodiments wherein the displaying means 315 are a liquid crystal display (also known as LCD), the mobile device 305 can comprise means to increase, rapidly and over a short period of time, the intensity of the current supplying the displaying means backlight 315. The short period of time corresponds at least to the exposure time. Such an increase in intensity can implemented by the creation of a controlled voltage pike.

The image-capturing means 310 comprises a lens to capture 340 at least one self-portrait image at the end of the countdown. The lens 340 can be mobile or fixed. The image capturing means 310 comprise be any type of image-capturing means 310 used in photography. In particular embodiments, the image-capturing means 310 can implement automatic image-processing.

The means to detect 320 a position, the means to trigger 325 the capture of at least one image, the means to initiate 330 a countdown, the means to increase 335 the brightness can be the same microprocessor.

In particular embodiments, the image-capturing means 310 and/or the mobile device 305 can comprise means to meter at least one characteristic of a scene captured by the image-capturing means 310, and means to balance the color temperature of the white in the predetermined image.

The characteristics to meter can be, for example:

the white balance, the exposure, a detection of another light source in the scene, an number of other light sources in the scene of a similar temperature of color or the average temperature of color of the scene.

In particular embodiments, the device can comprise means to modify at least one parameter of the partially white image. The parameter can be:

the hue of the partially white image or the luminous intensity of the partially white image.

In particular embodiments, if the mobile device 305 or the image-capturing means 310 comprises means to vibrate, the mobile device 305 or the image-capturing means 310 comprise means to deactivate the means to vibrate.

In particular embodiments, the mobile device 305 can implement an application. The application can comprise settings to be defined by the user, such as the image to display, the type of notification of the countdown, the type of hint at the end of the countdown and, the type of trigger to implement; for example. The application can automatically implement the detection, 12 or 22, of the position of the image-capturing means 310.

In particular embodiments, the settings of the mobile device 305 can be switched back to the settings implemented by the mobile device 305 before the trigger of the capture of at least one self-portrait image of the methods 10 and 20.

DESCRIPTION OF PREFERRED USE-CASES

Before using the method for producing at least one self-portrait image, a user can define parameters of the method on an application comprised by the mobile device 305. The parameters are:

the type of trigger of the capture of at least one self portrait-image, the type of hint provided to the user to look at the image-capturing means 310, the type of notification of the countdown,
the type of display of the scene captured by the image-capturing means 310,
the shape of the partially white image to display,
the duration of the countdown or
automatic image-processing parameters.

The type of trigger can be:
a physical interaction between the user and the mobile device 305, such as the activation of a button, the button is, for example, a digital button appearing the displaying means 315 if the displaying means 315 are a touchscreen, a touch sensor, a pushbutton,
a physical interaction between the user and the image-capturing means 310, such as the activation of a button, the button is for example a touch sensor or a pushbutton,
a voice activated trigger,
a facial recognition trigger, such as the detection of a wink or a smile, for example,
an image recognition trigger, such as the detection of the upper body of a human being,
a movement trigger, such as a wave of hand for example,
a detection of a generally still position, the position can be detected by an accelerometer comprised in the mobile device 305 or by a scene recognition, the scene being captured by the image-capturing means 310, and
more generally, any type of trigger implemented by any image-capturing means 310.

The type of hint provided to the user to look at the image-capturing means 310 can be:
a visual notification, such as a light blinking light,
a prerecorded text overlapping the scene captured by the image-capturing means 310, "look at the lens" for example,
a vocal message,
a text to speech synthesized voice, the speech can be adapted by the user for example,
a sound or
if the mobile device 305 is connected to a connected watch, a visual notification of the connected watch, for example.

The type of notification of the countdown can be:
a display of the countdown overlapping the scene captured by the image-capturing means 310, such as a text,
a visual notification, such as a light blinking light,
a vocal message,
a text to speech synthesized voice, the speech can be adapted by the user for example,
a sound or
if the mobile device 305 is connected to a connected watch, a visual notification of the connected watch, for example.

Concerning the type of notification of the countdown and the type of hint provided to the user, the user may predefine:
the vocal message by recording any other user's voice,
the sound,
the text to synthesize into speech,
the text to display.

The type of display of the scene captured by the image-capturing means 310 can be:
a display in transparency under the white image,
a facial recognition displaying a square or a predefined silhouette at the localization of the face of each user,
a display on a part of the displaying means 315.

While selecting the type of display, the user can deactivate the display of the scene captured. The user can also, if the type of display is on a part of the displaying means 315, select the size of the part of the displaying means 315 dedicated to the display of the scene captured by the image-capturing means 310.

The shape of the partially white image to display can be:
a square, displayed on all or part of the displaying means 315
a diamond,
a triangle,
an hexagon,
an octagon,
and more generally, any geometrical shape.

While selecting the shape of the partially white image, the user can adjust the size of the shape of the partially white image.

The duration of the countdown can be any time period. The automatic image-processing parameters can be any image-processing known to one skilled in the art.

It is considered that if the user does not define the previously cited parameters, predefined settings for said parameters are implemented.

In the use-case described hereafter the image-capturing means 310 are a separate device from the mobile device 305 and the user wants to capture one self-portrait image.

The user connects the image-capturing means 310 to the mobile device 305. During the step of connection, the image-capturing means 310 is connected to the mobile device 305 through means to connect such as a female connector complementary to a male connector or wireless means to connect. The means to connect are as described above at the descriptions of FIGS. 1, 2 and 3.

The position of the image-capturing means 310 is in relation to the orientation of the displaying means 315 of the mobile device 305. To produce a self-portrait image according to embodiments of the methods described above displaying means 315 and a lens 340 of the image-capturing means 310 should be oriented towards the same general direction. The general direction is defined as an orientation in which the user, holding the image-capturing means 310 or the mobile device 305, can appear in a scene, captured by the image-capturing means 310 and displayed by the displaying means 315, and can view the display of the scene on the displaying means 315. The detection of the position of the image-capturing means 310 in relation to the orientation of the displaying means 315 is as described above at the descriptions of FIGS. 1, 2 and 3.

Once such a position is detected, the user can trigger the capture one self-portrait image by the image-capturing means 310 according to the type of trigger defined.

Once the capture of one self-portrait image has been triggered, the countdown is initiated and lasts as long as defined. The countdown is notified to the user according to the defined type of notifications. Preferably, once the capture of one self-portrait image has been triggered, if the mobile device 305 comprises means to vibrate, said means are deactivated until the self-portrait image has been captured.

Just before the end of the countdown, a hint is provided to the user to look at the image-capturing means 310. The hint is according to the type of hint defined.

Then, the brightness of the displaying means 315 is increased and if the brightness of the displaying means 315 previously set to a maximum, the step of increase 25 locks the brightness settings. In particular embodiments wherein the displaying means 315 are a liquid crystal display (also known as LCD) the intensity of the current supplying the displaying means backlight 315 can be increased rapidly and over a short period of time in order to have a brighter lighting of the scene. The short period of time corresponds at least to the exposure time.

A meter of at least one characteristic of a scene captured by the image-capturing means 310 is implemented by the image-capturing means 310 or by the mobile device 305. The meter of at least one characteristic leads to the balance 28 of the color temperature of the white of a partially white image in relation to at least one characteristic metered.

The characteristics metered can be, for example:
the white balance,
the exposure,
a detection of another light source in the scene,
an number of other light sources in the scene of a similar temperature of color or
the average temperature of color of the scene.

In particular embodiments, the method can comprise a step of modification of at least one parameter of the partially white image. The parameter can be:
the hue of the partially white image,
the luminous intensity of the partially white image.

The partially white image is then displayed on the displaying means 315. The display of the partially white image reproduces the effect of a soft box. The shape and size of the partially white image is as defined. The temperature of the white in the partially white image is balanced according to the characteristic metered.

Preferably, the hint is provided simultaneously as the partially white image is displayed as the countdown arrives at zero.

While the countdown is notified, while the hint is provided and while the partially white image is displayed, the scene captured by the image capturing means 310 is displayed and the user can adjust the composition of the image until the capture of the self-portrait image. The display of the scene captured is according to the defined parameters.

At the end of the countdown, the self-portrait image is captured and is subject to automatic image-processing as defined by the user.

The settings of the mobile device 305 are switched back to the settings of the mobile device 305 before the user triggered the capture of the self-portrait image.

The self-portrait image is displayed on the displaying means 315 of the mobile device 305.

In the use-case described hereafter the image-capturing means 310 are a separate device from the mobile device 305 and the user wants to capture a stream of self-portrait images.

The user connects the image-capturing means 310 to the mobile device 305. During the step of connection, the image-capturing means 310 is connected to the mobile device 305 through means to connect such as a female connector complementary to a male connector or wireless means to connect. The means to connect are as described above at the descriptions of FIGS. 1, 2 and 3.

The position of the image-capturing means 310 is in relation to the orientation of the displaying means 315 of the mobile device 305. To produce a self-portrait image according to embodiments of the methods described above displaying means 315 and a lens 340 of the image-capturing means 310 should be oriented towards the same general direction. The general direction is defined as an orientation in which the user, holding the image-capturing means 310 or the mobile device 305, can appear in a scene, captured by the image-capturing means 310 and displayed by the displaying means 315, and can view the display of the scene on the displaying means 315. The detection of the position of the image-capturing means 310 in relation to the orientation of the displaying means 315 is as described above at the descriptions of FIGS. 1, 2 and 3.

Once such a position is detected, the user can trigger the capture the stream of self-portrait images by the image-capturing means 310 according to the type of trigger defined.

Once the capture of the stream of self-portrait images has been triggered, the countdown is initiated and lasts as long as defined. The countdown is notified to the user according to the defined type of notifications. Preferably, once the capture of one self-portrait image has been triggered, if the mobile device 305 comprises means to vibrate, said means are deactivated until the stream self-portrait images has been captured.

Just before the end of the countdown, a hint is provided to the user to look at the image-capturing means 310. The hint is according to the type of hint defined.

Then, the brightness of the displaying means 315 is increased and if the brightness of the displaying means 315 previously set to a maximum, the step of increase 25 locks the brightness settings.

A meter of at least one characteristic of a scene captured by the image-capturing means 310 is implemented by the image-capturing means 310 or by the mobile device 305. The meter of at least one characteristic leads to the balance 28 of the color temperature of the white of a partially white image in relation to at least one characteristic metered.

The characteristics metered can be, for example:
the white balance,
the exposure,
a detection of another light source in the scene,
an number of other light sources in the scene of a similar temperature of color or
the average temperature of color of the scene.

In particular embodiments, the method can comprise a step of modification of at least one parameter of the partially white image. The parameter can be:
the hue of the partially white image,
the luminous intensity of the partially white image.

The partially white image is then displayed on the displaying means 315. The display of the partially white image reproduces the effect of a soft box. The shape and size of the partially white image is as defined. The temperature of the white in the partially white image is balanced according to the characteristic metered.

Preferably, the hint is provided simultaneously as the partially white image is displayed as the countdown arrives at zero.

While the countdown is notified, while the hint is provided and while the partially white image is displayed, the scene captured by the image capturing means 310 is displayed and the user can adjust the composition of the image until the capture of the self-portrait image. The display of the scene captured is according to the defined parameters. The scene captured by the image-capturing means 310 is displayed until the capture of the stream of self-portrait images is stopped.

At the end of the countdown, the stream of self-portrait images is captured. The user ends the capture of the stream of self-portrait images using a trigger. The trigger can be any type of trigger described above. The user can define the type of trigger to implement in order to end the capture of the stream of self-portrait images using the application.

Once the capture of the stream of self-portrait images has ended, the stream of self-portrait images is subject to automatic image-processing as defined by the user.

The settings of the mobile device 305 are switched back to the settings of the mobile device 305 before the user triggered the capture of the stream of self-portrait images.

A preview, such as the first image of the stream of self-portrait images captured is displayed on the displaying means 315 of the mobile device 305.

In the use-case described hereafter the mobile device 305 comprises the image-capturing means 310 and the user wants to capture one self-portrait image.

The user activates the image-capturing means 310. In particular embodiments, once the user starts the application comprised by the mobile device 305, the image-capturing means 310 are activated. To produce a self-portrait image according to embodiments of the methods described above displaying means 315 and a lens 340 of the image-capturing means 310 should be oriented towards the same general direction. The general direction is defined as an orientation in which the user, holding the image-capturing means 310 or the mobile device 305, can appear in a scene, captured by the image-capturing means 310 and displayed by the displaying means 315, and can view the display of the scene on the displaying means 315.

Once the image-capturing means 310 are activated, the user can trigger the capture one self-portrait image by the image-capturing means 310 according to the type of trigger defined.

Once the capture of one self-portrait image has been triggered, the countdown is initiated and lasts as long as defined. The countdown is notified to the user according to the defined type of notifications. Preferably, once the capture of one self-portrait image has been triggered, if the mobile device 305 comprises means to vibrate, said means are deactivated until the self-portrait image has been captured.

Just before the end of the countdown, a hint is provided to the user to look at the image-capturing means 310. The hint is according to the type of hint defined.

Then, the brightness of the displaying means 315 is increased and if the brightness of the displaying means 315 previously set to a maximum, the step of increase 25 locks the brightness settings. In particular embodiments wherein the displaying means 315 are a liquid crystal display (also known as LCD) the intensity of the current supplying the displaying means backlight 315 can be increased rapidly and over a short period of time in order to have a brighter lighting of the scene. The short period of time corresponds at least to the exposure time.

A meter of at least one characteristic of a scene captured by the image-capturing means 310 is implemented by the image-capturing means 310 or by the mobile device 305. The meter of at least one characteristic leads to the balance 28 of the color temperature of the white of a partially white image in relation to at least one characteristic metered.

The characteristics metered can be, for example:
the white balance,
the exposure,
a detection of another light source in the scene,
an number of other light sources in the scene of a similar temperature of color or
the average temperature of color of the scene.

In particular embodiments, the method can comprise a step of modification of at least one parameter of the partially white image. The parameter can be:
the hue of the partially white image,
the luminous intensity of the partially white image.

The partially white image is then displayed on the displaying means 315. The display of the partially white image reproduces the effect of a soft box. The shape and size of the partially white image is as defined. The temperature of the white in the partially white image is balanced according to the characteristic metered.

Preferably, the hint is provided simultaneously as the partially white image is displayed as the countdown arrives at zero.

While the countdown is notified, while the hint is provided and while the partially white image is displayed, the scene captured by the image capturing means 310 is displayed and the user can adjust the composition of the image until the capture of the self-portrait image. The display of the scene captured is according to the defined parameters.

At the end of the countdown, the self-portrait image is captured and is subject to automatic image-processing as defined by the user.

The settings of the mobile device 305 are switched back to the settings of the mobile device 305 before the user triggered the capture of the self-portrait image.

The self-portrait image is displayed on the displaying means 315 of the mobile device 305.

In the use-case described hereafter the image-capturing means 310 are a separate device from the mobile device 305 and the user wants to capture a stream of self-portrait images.

The user activates the image-capturing means 310. In particular embodiments, once the user starts the application comprised by the mobile device 305, the image-capturing means 310 are activated. To produce a self-portrait image according to embodiments of the methods described above displaying means 315 and a lens 340 of the image-capturing means 310 should be oriented towards the same general direction.

The general direction is defined as an orientation in which the user, holding the image-capturing means 310 or the mobile device 305, can appear in a scene, captured by the image-capturing means 310 and displayed by the displaying means 315, and can view the display of the scene on the displaying means 315.

Once the image-capturing means 310 are activated, the user can trigger the capture the stream of self-portrait images by the image-capturing means 310 according to the type of trigger defined.

Once the capture of a stream of self-portrait images has been triggered, the countdown is initiated and lasts as long as defined. The countdown is notified to the user according to the defined type of notifications. Preferably, once the capture of one self-portrait image has been triggered, if the mobile device 305 comprises means to vibrate, said means are deactivated until the stream self-portrait images has been captured.

Just before the end of the countdown, a hint is provided to the user to look at the image-capturing means 310. The hint is according to the type of hint defined.

Then, the brightness of the displaying means 315 is increased and if the brightness of the displaying means 315 is previously set to a maximum, the step of increase 25 locks the brightness settings.

A meter of at least one characteristic of a scene captured by the image-capturing means 310 is implemented by the image-capturing means 310 or by the mobile device 305. The meter of at least one characteristic leads to the balance 28 of the color temperature of the white of a partially white image in relation to at least one characteristic metered.

The characteristics metered can be, for example:
the white balance,
the exposure,
a detection of another light source in the scene, an number of other light sources in the scene of a similar temperature of color or the average temperature of color of the scene.

In particular embodiments, the method can comprise a step of modification of at least one parameter of the partially white image. The parameter can be:

the hue of the partially white image, the luminous intensity of the partially white image.

The partially white image is then displayed on the displaying means 315. The display of the partially white image reproduces the effect of a soft box. The shape and size of the partially white image is as defined. The temperature of the white in the partially white image is balanced according to the characteristic metered.

Preferably, the hint is provided simultaneously as the partially white image is displayed as the countdown arrives at zero.

While the countdown is notified, while the hint is provided and while the partially white image is displayed, the scene captured by the image capturing means 310 is displayed and the user can adjust the composition of the image until the capture of the self-portrait image. The display of the scene captured is according to the defined parameters. The scene captured by the image-capturing means 310 is displayed until the capture of the stream of self-portrait images is stopped.

At the end of the countdown, the stream of self-portrait images is captured. The user ends the capture of the stream of self-portrait images using a trigger. The trigger can be any type of trigger described above. The user can define the type of trigger to implement in order to end the capture of the stream of self-portrait images using the application.

Once the capture of the stream of self-portrait images has ended, the stream of self-portrait images is subject to automatic image-processing as defined by the user.

The settings of the mobile device 305 are switched back to the settings of the mobile device 305 before the user triggered the capture of the stream of self-portrait images.

A preview, such as the first image of the stream of self-portrait images captured is displayed on the displaying means 315 of the mobile device 305.

The invention claimed is:

1. A method for producing at least one self-portrait image using a mobile device comprising a display and an image-capturing device following at least one capture trigger of the image-capturing device, comprising the steps of:

detecting a position of the image-capturing device in relation to an orientation of the display;

performing following steps in response to determination that said mobile device and lens of the image-capturing device are oriented substantially towards a same direction: increasing a brightness of the display; displaying a predetermined image on the display; and capturing of at least one self-portrait image; and wherein the predetermined image is a partially white image, and an uniformity of the partially white image is locally adjusted to compensate a light emittance angular disparity when several subjects are in a field of view or not centered.

2. The method according to claim 1, further comprising the steps of triggering a capture of at least one image by the image capturing device; and initiating a countdown.

3. The method according to claim 2, wherein the steps of increasing the brightness of the display and displaying the predetermined image on the display are performed just before an end of the countdown, and wherein the step of capturing said at least one self-portrait image is performed at the end of the countdown.

4. The method according to claim 1, wherein a trigger for capturing said at least one self-portrait image comprises a voice, a smile or a button.

5. The method according to claim 1, wherein the step of displaying the predetermined image comprises the steps of metering at least one characteristic of a scene captured by the image-capturing device; and balancing a color temperature of the white in the predetermined partially white image.

6. The method according to claim 1, further comprising the step of detecting a position of the display and lens of the image-capturing device oriented towards same general direction.

7. The method according to claim 2, wherein the step of initiating the countdown comprises the step of notifying of the countdown.

8. The method according to claim 2, further comprising the step of providing a hint to a user to look at the image-capturing device, just before an end of the countdown.

9. The method according to claim 6, further comprising the step of determining the orientation towards the same general direction.

10. The method according to claim 9, wherein the mobile device comprises an accelerometer and the image-capturing device comprises an accelerometer, and wherein the step of determining the orientation towards the same general direction depends on a scalar product of vectors representative of gravity of each accelerometer.

11. The method according to claim 9, wherein the image-capturing device is separate from the mobile device and the mobile device comprises another image-capturing device, and wherein the step of determining the orientation towards the same general direction depends on an image-recognition.

12. The method according to claim 1, wherein the display is a liquid crystal display; and wherein the step of increasing the brightness rapidly increases intensity of a current supplying a backlight of the display over a short period of time.

13. A method for producing at least one self-portrait image using a mobile device comprising a display and an image-capturing device comprising the steps of:

detecting a position of the image-capturing device in relation to an orientation of the display such that the display and lens of the image-capturing device are oriented towards same general direction;

determining the orientation towards the same general direction;

triggering a capture of at least one image by the image-capturing device;

initiating a countdown;

notifying of the countdown;

just before an end of the countdown:

providing a hint to a user to look at the image-capturing device;

increasing brightness of the display;

metering at least one characteristic of a scene captured by the image-capturing device;

balancing a color temperature of a white in a partially white image;

displaying the partially white image on the display; and at the end of the countdown, capturing at least one self-portrait image.

14. A device to produce at least one self-portrait image comprising:

a mobile device comprising:

a display to display a predetermined image just before an end of a countdown;

a detector to detect a position of an image-capturing device in relation to an orientation of the display;

a trigger to initiate a capture of at least one image by the image-capturing device;

a countdown initiator;

a processor; and a control to increase brightness of the display, just before the end of the countdown;

the image-capturing device comprising lens to capture at least one self-portrait image at the end of the countdown;

wherein the processor is configured to determine that said mobile device and the lens of the image-capturing device are oriented substantially towards a same direction; and wherein the predetermined image is a partially white image, and an uniformity of the partially white image is locally adjusted to compensate a light emittance angular disparity when several subjects are in a field of view or not centered.

* * * * *